Aug. 25, 1931.  F. W. BAKER  1,820,173
DEMOUNTABLE WHEEL RIM
Filed Feb. 1, 1926  3 Sheets-Sheet 2

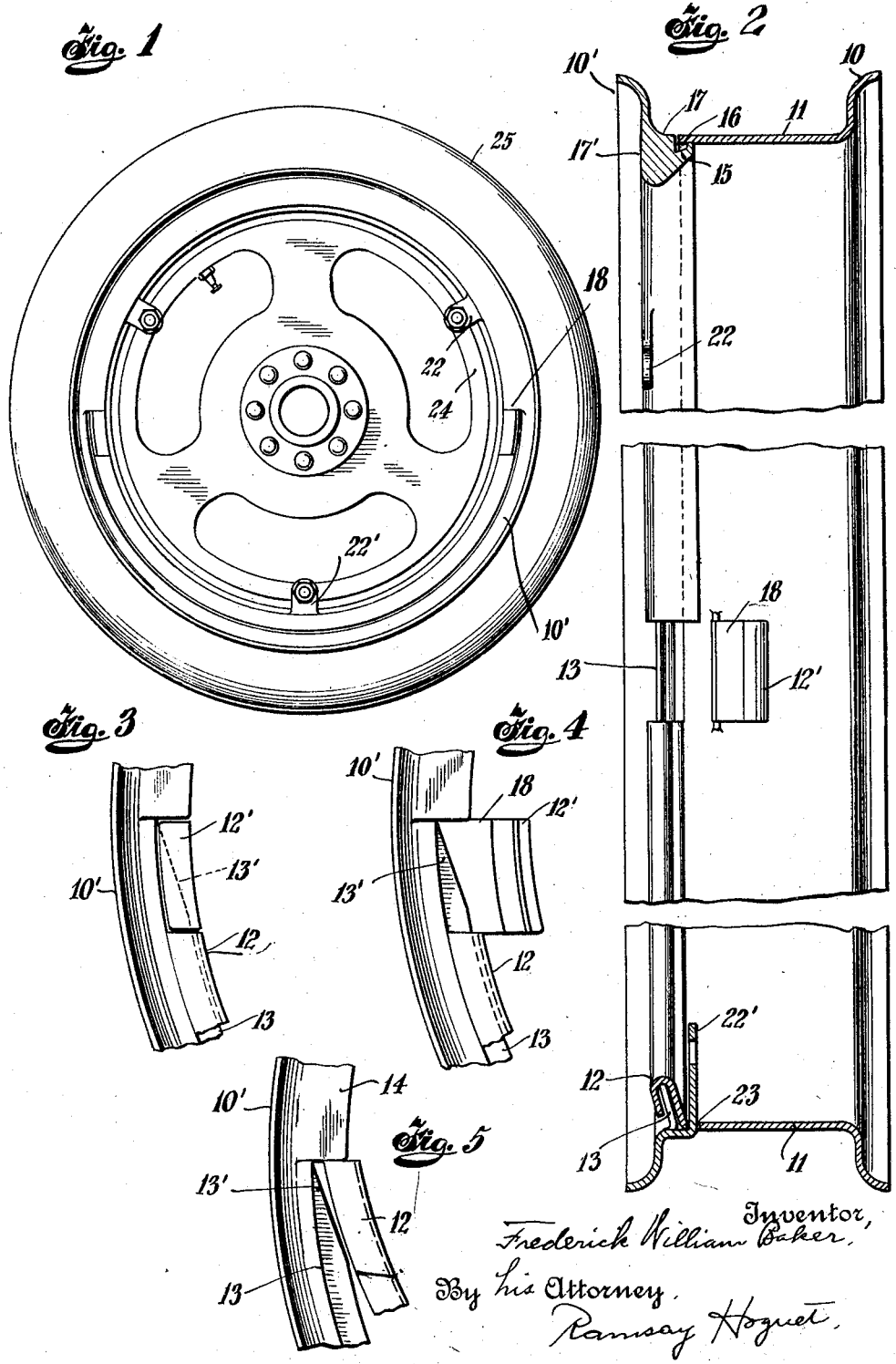

Frederick William Baker, Inventor
By his Attorney
Ramsay Hoguet

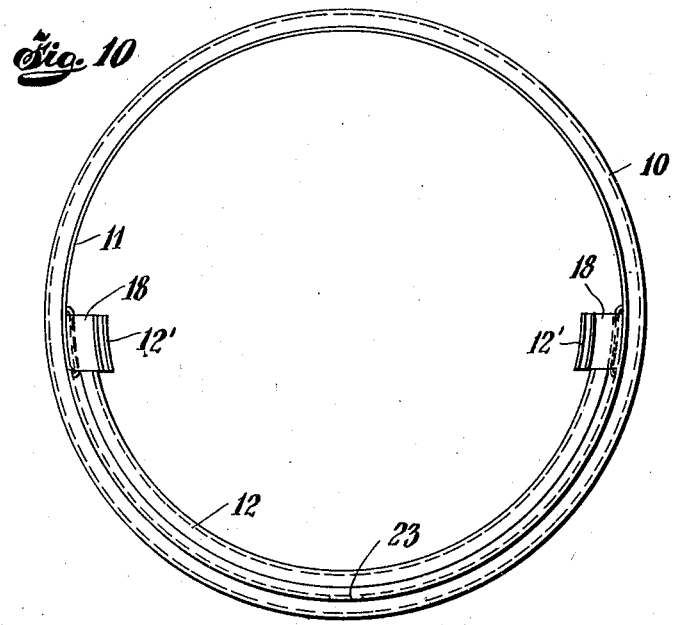
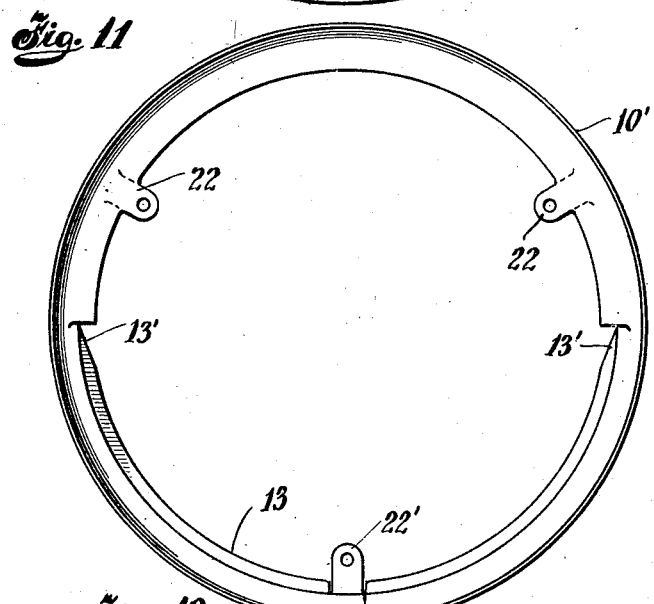
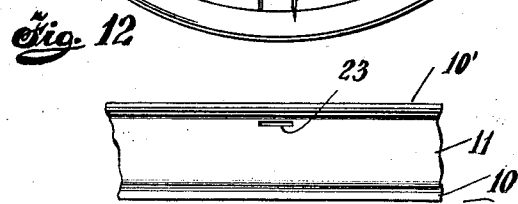

Patented Aug. 25, 1931

1,820,173

UNITED STATES PATENT OFFICE

FREDERICK WILLIAM BAKER, OF STOURBRIDGE, ENGLAND, ASSIGNOR TO TRINITY WHEEL CORPORATION, A CORPORATION OF NEW YORK

DEMOUNTABLE WHEEL RIM

Application filed February 1, 1926. Serial No. 85,260.

My invention relates to improvements in demountable wheel rims, such as I have used in connection with vehicle wheels and more particularly the wheels of motor cars to support a pneumatic or other tire.

The difficulty with most demountable wheel rims is that while they are demountable in theory, in actual use it is often extremely difficult to demount the rims or separate the rim parts to facilitate the removal of the tire.

The object of my invention is to overcome this difficulty and produce a simple and strong demountable rim having opposed complementary parts which are separable in the direction of the axis of the wheel and which can be separated or fastened together with the utmost facility and are not likely to be disarranged or obstructed by actual road use.

My invention is further intended to produce a rim having axially separable parts that are peculiar in this way that when alined as in the position for use, the parts are in locking engagement but by sliding one on the other they become positioned so as to be separated with the utmost ease.

A further characteristic of my improved structure is that I have the two separable parts complementary to each other and arranged to interlock when alined as above stated and to separate when in eccentric relation to each other so that by placing them together eccentrically and then aligning them they are locked and it is a simple matter to provide a means for holding them in locking engagement. In my improvement I dispose this holding means so that it holds the parts in locked engagement and serves to fill out and complete the rim structure.

Incidentally my embodiment comprises interlocking parts which carry with themselves means for securely locking them together and are not dependent on any extraneous locking devices.

My invention is further intended to produce a structure in which the rim when assembled and ready for use has all the appearance of a solid rim and is equally strong.

These and other advantages and improved features of my demountable rim will appear more clearly in the description, which follows:

Reference is had to the accompanying drawings in which similar reference characters refer to similar parts throughout the several views.

Figure 1 is a side elevation of my improved rim as applied to a wheel and tire.

Figure 2 is a broken cross section of the rim on the line 2—2 of Figure 6.

Figure 3 is a broken detail side elevation of the means for holding the parts in locked position.

Figure 4 is a detail similar to Figure 3, but with the locking latch open.

Figure 5 is a detail similar to Figures 3 and 4 but showing the rim members in a position to be put together or separated.

Figure 10 is an elevation of one of the rim members.

Figure 11 is an elevation of the second rim member, and

Figure 12 is a broken detail face view of a segment of the two rim members.

Figure 6:
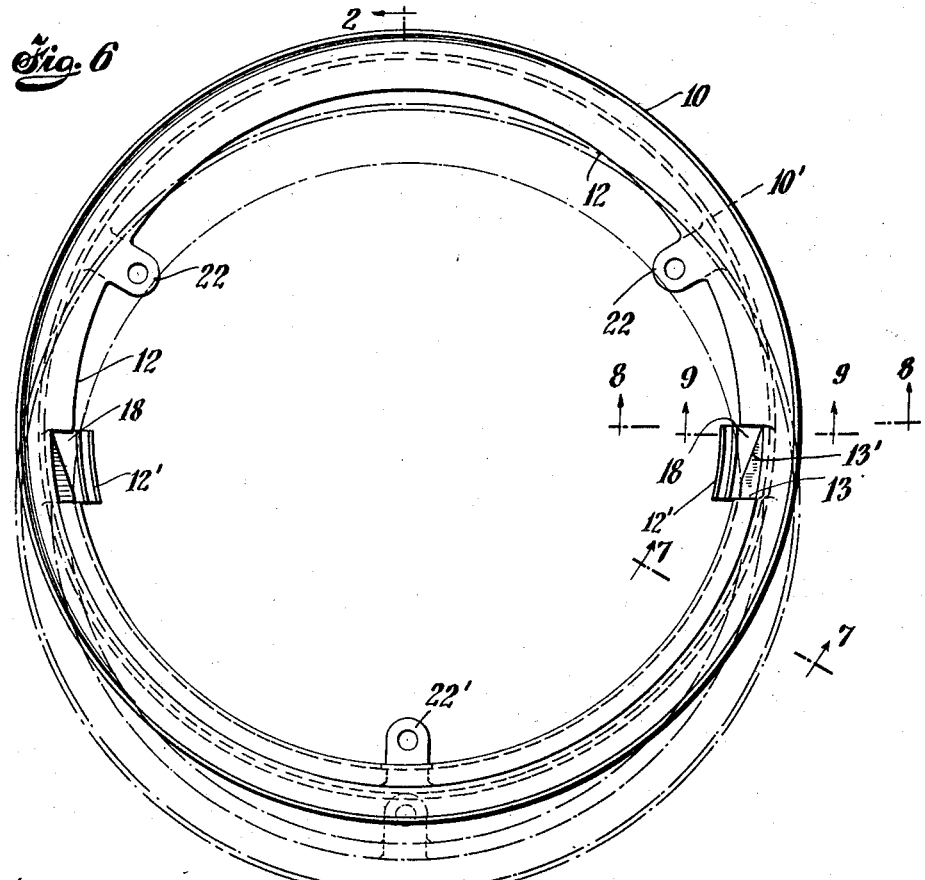
Figure 6 is an elevation showing the manner in which the complementary members of the rim are assembled and in dotted lines the sliding arrangement of the two parts.
Figure 7:
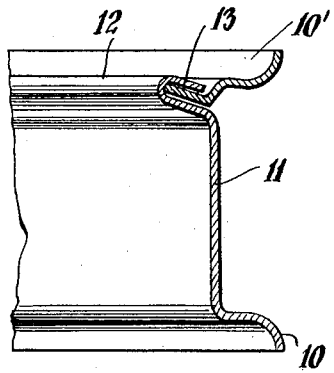
Figure 7 is a broken detail cross section on the line 7—7 of Figure 6.
Figure 8:
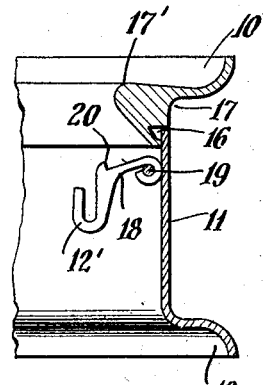
Figure 8 is a broken detail cross section on the line 8—8 of Figure 6.
Figure 9:
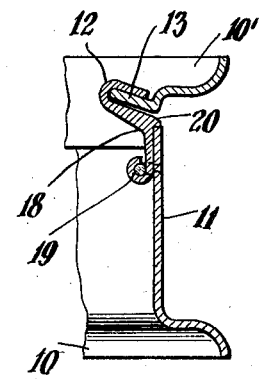
Figure 9 is a broken cross section on the line 9—9 of Figure 6.

The rim in the embodiment shown is composed of two complementary flange members 10 and 10' which in their general contour are of conventional shape, but which may obviously be shaped to fit any approved style of shoe or tire. Both these members 10 and 10' have continuous side flanges and the flange 10 carries the major and continuous portion of the tire bed 11 which for nearly one half its inner circumference is provided with an inwardly extending hollow rib 12 generally U-shaped in cross section which serves as a socket and also as a brace to give the complete rim additional rigidity.

The socket 12 of the bed 11 extends as stated for nearly one half the inner circumference of the member 10 and it is adapted to receive the rib or extension 13 which projects inwardly from the member 10' and is arranged on nearly one half the inner periphery of said member. The rib 13 is tapered or beveled at its ends as shown at 13' in Figure 11 to the end that it may clear the socket 12 of the member 10 when the parts are in eccentric relation as presently described. The member 10' has on its inner periphery and on the opposite part from the rib 13 a bead 17' which alines with the rim and which has its inner face shaped as at 17, Figure 2 to form a lateral extension of the bed 11. This bed has a groove 15 in its outer surface and near its inner edge to receive the turned in or flanged edge 16 of the bed 11.

To put the two members 10 and 10' together they are placed opposite each other as in Figure 6 and then the one member is slid on the other a short distance as shown by dotted lines so as to bring the two members in eccentric relation this bringing the tapered portions 13' and the rib 13 in position to clear the end portions of the socket 12 on the opposed member. They are then pushed together thus bringing the rib 13' into alinement with the socket 12 and the rib enters the socket with the part 16 seated in the groove 15. The parts are held in this position by a member 18 which is in the form of a latch and which fills the space between the end of the bead 12' on one member and the bead 17' on the other thus completing the rim and holding the parts against any relative movement. In the drawings I have shown two of these latches 18, each pivoted as shown at 19 to the inner side of the bed 11 and each having a shoulder 20 which locks over the edge of the bed 11, and also a hook 12' which forms an extension of the socket 12 so that when the parts are put together and then rotated slightly in relation to each other, a solid part of the rib 13 may be made to enter the part 12' of each latch and the complementary parts are absolutely locked against displacement. To separate the members it is only necessary to turn back the latches 18 so as to permit the members to be slipped one on the other to bring them into eccentric relation and to bring the tapered parts 13' of the rib 13 in position to clear the opposite part of the socket 12, after which the two parts can be separated with the utmost ease.

The rim can be applied to a wheel in any usual or preferred way but I have illustrated a simple means in which the member 10' is provided with inwardly extending lugs 22 which can be bolted or otherwise fastened to a felly 24 of the wheel and a tire 25 can be applied to the rim as usual. If desired a lug 22' can be made to extend through a corresponding hole 23 in the bed 11 as shown best in Figures 2 and 12 and this serves as an additional means of locking the parts 10 and 10' together.

From the foregoing description it will be seen that I have designed an exceedingly simple but unusually strong wheel rim in which the only thing necessary to provide for the separation of the two complementary members is to swing in the latches 18, slide one member in relation to the other a short distance and then pull them apart.

It will be understood that while I have shown two latches 18, one would serve the purpose, and that other means for locking the complementary parts so that they cannot slide in relation to each other can be substituted for the latch without affecting the invention.

I claim:

1. A wheel rim having opposed separable complementary parts one having a continuous and connected flange and tire bed with a segmental socket member at the free edge of the bed, the second part having a continuous flange with a segmental rib disposed to enter the socket of the first part and a segmental inner bead disposed to aline with the socket of the first part, and a displaceable member fitting between the said socket and bead to hold the parts in locked engagement.

2. A wheel rim having two separable complementary parts one with a side flange and attached bed having an inturned free edge for a part of its circumference and a segmental socket for another part of its circumference, and the second member having a side flange and a segmental rib to enter the socket of the first member and a segmental bead groove to receive the inturned edge of the bed of the first member, the second member having a lug adapted to project through a hole in the bed of the first member for attachment to the wheel.

3. A wheel rim comprising two separable members one having a continuous flange and a continuous tire bed with a segmental socket on the free edge of the bed and a segmental bead spaced from and aligning with the socket, the second member having a flange, a segmental rib disposed to enter the socket of the first member and a segmental part complementary to the bead of the first member, and a latch pivoted on the inner side of the bed and adapted to swing to position between the bed and socket members and form a continuation of the socket.

4. A wheel rim comprising two axially separable members, one having a continuous flange and a continuous tire bed with a segmental socket member at the free edge of the tire bed, and the second member having a continuous flange and a segmental rib to enter the socket of the first member, the two members having also segmental complementary engaging parts spaced apart from the rib and socket, and a displaceable member filling the gap between the rib and socket and the complementary engaging parts aforesaid, thereby locking the two members of the rim together.

In testimony whereof, I have signed my name to this specification this 28th day of January, 1926.

FREDERICK WILLIAM BAKER.